United States Patent [19]

Ripatonda

[11] Patent Number: 4,770,588

[45] Date of Patent: Sep. 13, 1988

[54] UNIVERSAL FEED CONTAINER FOR AUTOMATIC DISTRIBUTION OF FOODS

[75] Inventor: Gilberto Ripatonda, Suzzara Montova, Italy

[73] Assignee: Elettromeccanica Suzzarese, Suzzara, Italy

[21] Appl. No.: 922,188

[22] Filed: Oct. 23, 1986

[30] Foreign Application Priority Data

Oct. 24, 1985 [IT] Italy .............................. 5058/85[U]

[51] Int. Cl.$^4$ ............................................ B65G 59/10
[52] U.S. Cl. ................................... 414/125; 221/221; 221/242; 414/900
[58] Field of Search ...................... 414/125, 126, 900; 221/221, 223, 242, 297

[56] References Cited

U.S. PATENT DOCUMENTS

| | | | |
|---|---|---|---|
| 2,589,600 | 3/1952 | Burkholder | 221/221 |
| 3,379,346 | 4/1968 | Frederick et al. | 221/221 X |
| 3,795,344 | 3/1974 | Falk et al. | 221/221 X |
| 4,019,452 | 4/1977 | Rouse | 414/35 X |

Primary Examiner—Leslie J. Paperner
Attorney, Agent, or Firm—Stevens, Davis, Miller & Mosher

[57] ABSTRACT

A feeder for containers comprising a magazine having counter-positioned controls for positioning a pile of containers, and a trolley movable horizontally, relative to the pile, and with two sheets for engaging the lowermost container of the pile, and with components for separating the lowermost container from the pile and having various further components whereby it can accommodate containers of various sizes and shapes.

7 Claims, 2 Drawing Sheets

U.S. Patent  Sep. 13, 1988  Sheet 1 of 2  4,770,588
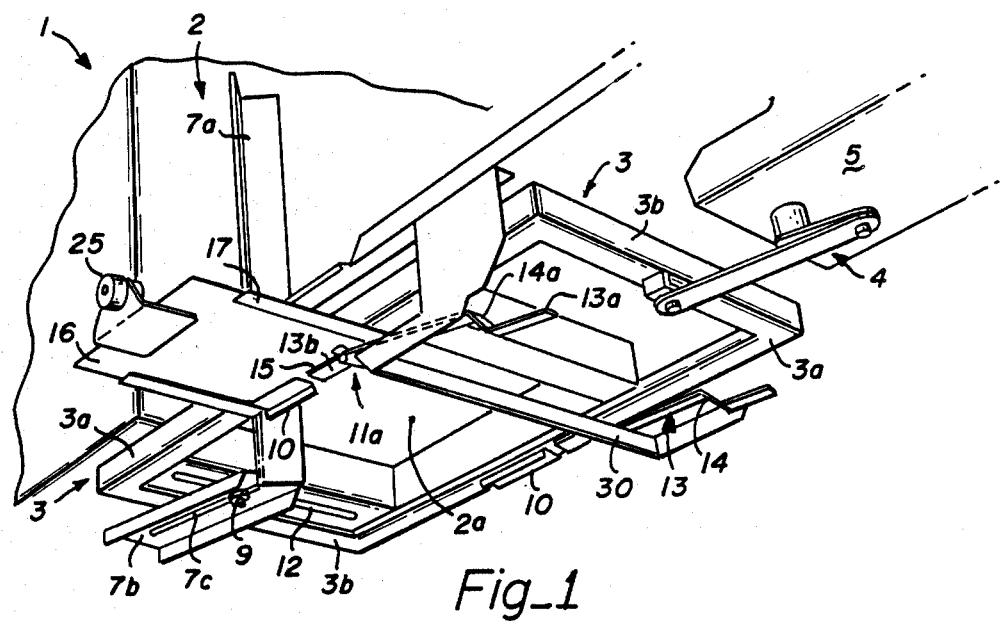
Fig_1
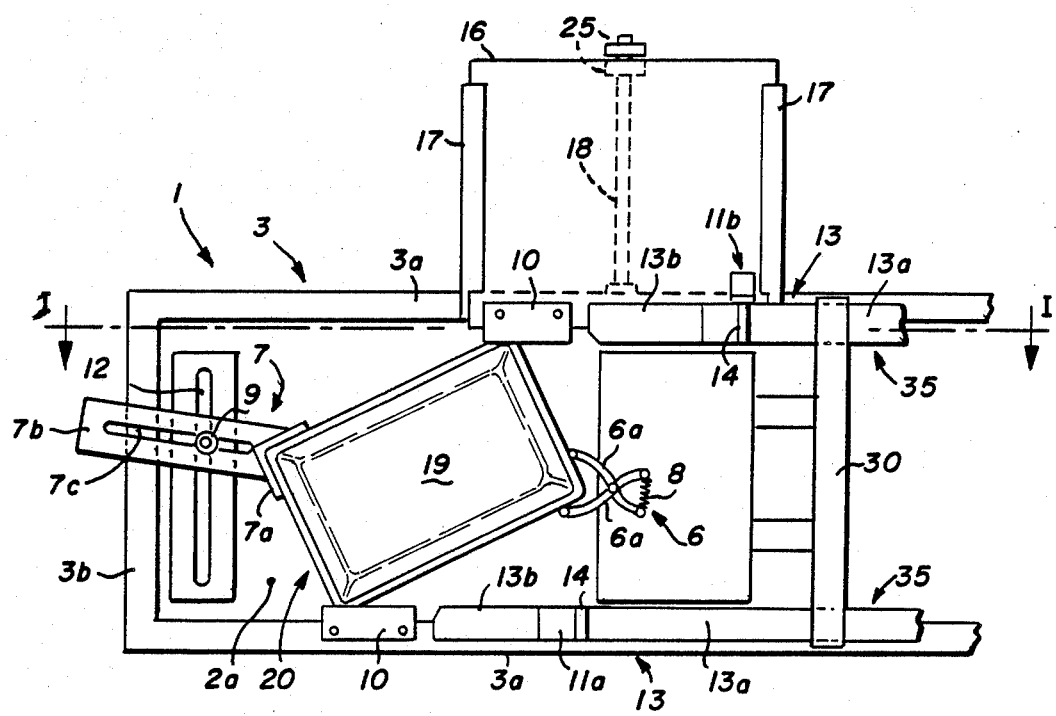
Fig_2

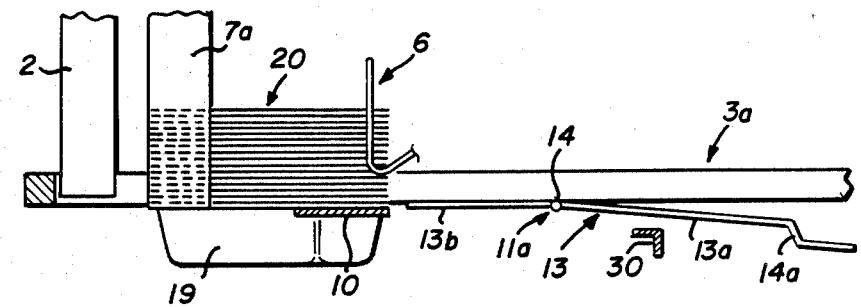
Fig_3a
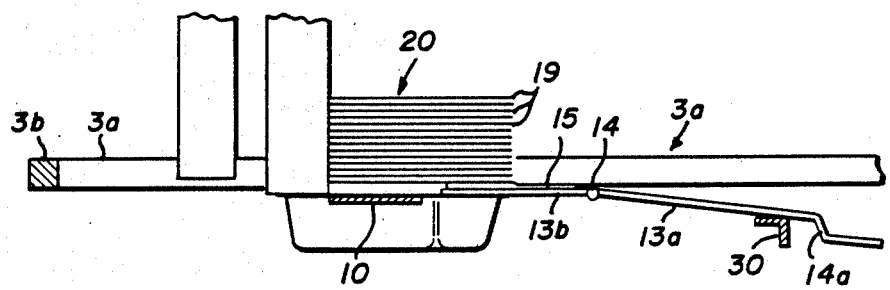
Fig_3b
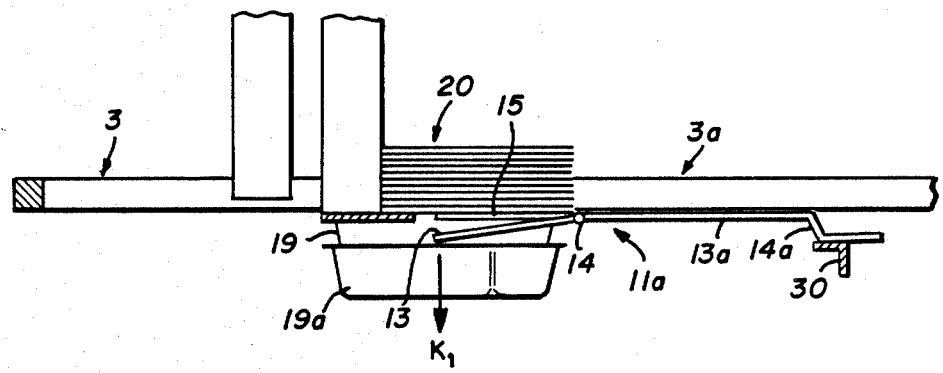
Fig_3c

UNIVERSAL FEED CONTAINER FOR AUTOMATIC DISTRIBUTION OF FOODS

BACKGROUND OF THE INVENTION

1. Field of the Invention

The present invention relates to automatic distributors of foods and/or beverages.

2. Description of the Prior Art

It is noted that automatic distributors of foods and/or beverages, with the exception of those for pre-prepared products, require a container magazine provided with devices enabling withdrawal, one-by-one, of the containers and to position them in order to receive the product. Obviously, this only occurs as a consequence of the activation of the distributor itself on behalf of the user.

There have been noted technical solutions enabling accomplishment of the aforementioned operations operating on magazines formed of a multiplicity of containers inserted one within the other in order to form a pile. From the pile thus formed, suitable devices, in following descriptions, are enabled at the same time to support the pile itself without detaching from the last container placed at the base, which will subsequently be positioned in order to receive the product and then taken by the user.

A disadvantage lamented of the prior art solutions pertains to the strict dependent between the shape of the container and the proper operation of the feeder. In other words, it turns out to be impossible to adapt containers of shapes and/or dimensions different from those provided for in planned seats of the feeder.

Also, in case of drink containers, the tolerances provided for on the diameter are decidedly restricted, reducing the regularity of operation of all the devices.

Thus, including notable disadvantages with respect to the possibility of using only a single type of container which renders utilization of the distributor less flexible; in addition, problems arise pertaining to the supplies of the containers themselves, which problems could be of availability or of economic nature.

SUMMARY OF THE PRESENT INVENTION

An object of the present invention is to provide a feeder which turns out to be universal with respect to a vast range of containers, while not altering the characteristics of functionality of the devices cited.

A further object of the present invention is to provide a feeder which is reliable in operation and economical in cost.

A preferred embodiment of the present invention includes a universal container feeder, associated with an automatic food distributor and including: a magazine provided with first and second components for positioning and lateral containment of a pile of containers; a trolley movable on a horizontal plane during its operative phase; power components working in correspondence with a lower opening of the magazine; said trolley being provided with third components for the interdiction and the support of the lower containers of the pile; fourth components designed for the interdiction of the container immediately overlying the lower one, operating in phase with the movement of the trolley and provided for the separation of the lower container of said pile; said feeder characterized by the fact that the second, third and fourth components turn out to be positionable in correspondence with said lower opening according to variable horizontal coordinates to be defined in mutual cooperation and in phase with the cited trolley, respectively and in succession; a support bar for said pile and a group for the separation from the last of the containers coming to occupy the lower position.

The characteristics of the present invention are evidenced in the following description of the preferred embodiment which is illustrated in the drawing figures.

IN THE DRAWING

FIG. 1 is a perspective view of the base of the feeder;

FIG. 2 is a diagram of the feeder along a view from the beginning of the base; and FIGS. 3a, 3b and 3c are each a lateral sectioned view along the line I—I of FIG. 2, illustrating various moments of the operative phase of the feeder.

DESCRIPTION OF THE PREFERRED EMBODIMENT

With reference to said figures, FIGS. 1 and 2 illustrate a feeder referred to by the general reference character 1. The feeder 1 includes a magazine 2 with vertical development and a trolley 3, operating in correspondence with a lower opening 2a of the magazine 2. The trolley 3 is movable along a horizontal plane, during its operative phase, by means of a mechanism 4 of a connecting rod-crank type with which the trolley 3 is associated, and activated by a motor 5 supported by the structure of the magazine 2.

The magazine 2 is provided with a pair of counter-positioned controls 6 and 7, situated within the interior of the lower opening 2a, and designed for the positioning and the lateral containment of a pile formed by a multiplicity of containers 19.

The control 6 is positioned in stable fashion with respect to the opening 2a and includes two articulated levers 6a, which are subjected to the action of an elastic component 8 exerting a convergent action on the levers 6a.

The control 7 comprises an angular contour 7a arranged vertically and joined by a horizontal metal plate 7b intersected by a longitudinal slit 7c.

The magazine 2 is intersected by a transversal slit 12 located about one side of the lower opening 2a in opposite position with respect to the control 6.

A connector component 9 is engaged in the interior of the slit 12 and in a position to be inserted into the slit 7c of the control 7, which thus turns out to be positionable and blockable, in the interior of the opening 2a, along variable horizontal coordinates, as a function of the shape and/or dimensions of the container 19 inserted into the magazine 2.

The trolley 3 is constructed by two bars 3a connected in parallel at their ends by two cross-pieces 3b. One of the cross-pieces 3b is associated with the rod-crank mechanism 4, which imparts to the trolley 3, during the operative phase an alternating movement from a dead internal point to a dead external point and vice versa.

A pair of thin plates 10 are each bound to one bar 3a and extends to the interior of the opening and designed to receive in support a supply of the containers 19 occupying the lower position of a pile 20 of such containers 19 (see FIGS. 3a–3b).

A device 11a is associated in position aligned with respect to one of the thin plates 10 and operates in relation and in phase with movement of the trolley 3 and with an analogous device 11b arranged on the other side of the opening 2a to define a separation group 35.

Each device 11a and 11b is substantially composed of a boom 13 bound with a hinge 14 at its intermediate point, to the bar 3a, and determining two segments 13a and 13b, with the segment 13a provided by a tooth 14a accomplished in proximity to the free end, and the segment 13b designed to intercept on sight a corresponding thin sheet 15 fastened jointly to the bar 3a.

A slot 16 is formed intermediate a pair of guides 17 extending perpendicularly from the bar 3a. The slot 16 is therefore transversally movable with respect to the bar 3a, in such a mode that the amplitude of width is variable between the components 10 and 11a and the associated and corresponding components 10 and 11b associated with the opposite bar 3a.

The slot 16 is easily engaged with a threaded bar 18 associated with the bar 3a and parallel to the guides 17.

Two threaded sleeves 25 are engaged with the bar 18 and turn out to be provided for the positioning and blockage of the slot 16, not only for the definition of fixed magnitudes of width between the components 10 and 11b and 10 and 11a positioned on both sides of the opening 2a as a function of the dimensions of the containers 19 being supported (FIGS. 1 and 2).

There will now be briefly described the operative phase of the feeder 1 under consideration, with reference to FIGS. 3a, 3b and 3c. FIG. 3a demonstrates the deactivated feeder 1, with the trolley 3 at rest and the thin sheets 10 recanted in support of a pile 20 of containers 19. The activation of the feeder 1, setting into movement the mechanism 4, includes the advance toward the left of the trolley 3, with consequent disengagement of the thin sheets 10 with the border of the lowermost container 19. The portions 13b and thin sheets 15, arranged in a package between them, are situated at a height such that, with respect to the thin sheets 10, they can be inserted between the lowermost container 19 and the container immediately overlying it. Thus, there occurs at this point the initiation of the separation of the lowermost container 19 from the pile 20 (FIG. 3b). The advancement of the trolley 3 induces the interaction of the teeth 14a accomplished on the portion 13a of the booms 13, with a control 30 joined to the magazine 2. Thus as a consequence, there is a rotation toward the base, along the path K1 of the portion 13b (see FIG. 3c).

The pile 20 is then sustained in support by the attached thin plate 15, while the lowermost container 19 is expelled toward the base where non-illustrated components would derive its positioning for the reception of the product (FIG. 3c).

The trolley 3 clasped in the position of dead external point initiates its return course, with consequent inverse order of the operations carried out by the separation group 35 and passage of the pile 20 from support on the thin sheet 15 to support on the thin sheet 10 with the lowering of a new container 19 to occupy the lowermost position, in order to return to the position illustrated in FIG. 3a.

From the foregoing description, it remains evident that the possibility of regulating the position of the control 7 and the magnitude of width between the components 10, 11 as a function of the type of container 19 utilized does not influence the reliability of operation of the feeder 1, therefore freeing the feeder from the requirement of engaging a single type of container.

The advantage derived because of the possibility of successively varying the origin as a function of a changed necessity of engagement or as a function of a possible economical advantage, could be utilized for one container instead of another.

The preceding considerations also remain valid if it is desired to utilize beverage containers, for example in order to distribute drinks, in place of the little reservoirs illustrated. The differences of diameter existing between one supply of drinks and the other are "absorbed" by the characteristics of universality of the container under consideration.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted and covering all alterations and modifications as fall within the true spirit and scope of the invention.

I claim:

1. A universal container feeder for an automatic feed distributor comprising:
   a magazine having first and second components for positioning and laterally containing a pile of containers, said first component being comprised of a pair of blockage members pivotally mounted to the magazine and having a biasing device attached between said blockage members;
   a trolley movable along a horizontal plane during its operative phase by power components and operating in correspondence with an opening in the magazine, the trolley having a third component for interdiction and support of a lowermost container of said pile, and a fourth component for interdiction of a container of said pile immediately overlying said lowermost container and operating in relation to the phase with movement of the trolley and for providing for disengagement of said lowermost container from said pile, the second, third and fourth components being positioned in correspondence with said lower opening along variable horizontal coordinates defined in mutual cooperation and in phase with the trolley; and
   a separation means for the separation of said lowermost container from the remaining containers in said pile.

2. A feeder of claim 1 wherein,
   said second component being comprised of a blockage member having a longitudinal slit engaged to a transversal slit of the magazine with said blockage member of the second component being adjustable rotationally and in two directions relative to the magazine.

3. A feeder of claim 1 wherein,
   said third component includes two sheets counterpositioned in parallel with a plurality of bars of the trolley; and in which
   said fourth component comprises two sheets, each one being aligned with one of said third component sheets, with one of said third component sheets and one of said fourth component sheets each joined to a slit which is movable transversely with respect to said bars through the presence of a guide with said slit being adjustable to accomodate a variety of container sizes and shapes.

4. A universal container feeder for an automatic feed distributor comprising:

a magazine for positioning and laterally containing a pile of containers;

a trolley movable along a horizontal plane during its operative phase by power components and operating in correspondence with an opening in the magazine;

a platform mounted in guide members attached to the trolley;

a first and a second support member for intercepting and supporting a lowermost container of said pile, the first support member attached to the trolley and the second support member attached to the platform;

a first and a second disengagement member for passing between said lowermost container of said pile and the remaining containers of said pile, the first disengagement member attached to the trolley and the second disengagement member attached to the platform; and a first and a second separation means for separating said lowermost container from the remaining containers of said pile, the first separation means attached to the trolley and the second separation means attached to the platform.

5. A feeder of claim 4 wherein, the magazine has a first component comprised of a pair of blockage members pivotally mounted to the magazine and having a biasing device attached between said blockage members; and the magazine has a second component comprised of a blockage member having a longitudinal slit engaged to a transversal slit of the magazine with said blockage member of the second component being adjustable rotationally and in two directions relative to the magazine.

6. A feeder of claim 5 wherein, the blockage member of the second component has a pair of vertical planes intercepting at an angle to receive an angular corner of said pile of containers.

7. The feeder of claim 6 wherein, the first separation means comprises a first non-straight boom bent at a hinge point, said first boom rotationally mounted to the trolley at said hinge point with a leading segment of said first boom being positioned even with and directly below the first disengagement member, a tail segment of said first boom having a tooth section for sliding over a control member, said control member being mounted in a fixed position relative to the magazine; and the second separation means comprises a second non-straight boom bent at a hinge point, said second boom rotationally mounted to the platform at said hinge point with a leading segment of said second boom being positioned even with and directly below the second disengagement member, a tail segment of said second boom having a tooth section for sliding over said control member.

* * * * *